(12) United States Patent
Kuei et al.

(10) Patent No.: US 12,538,407 B2
(45) Date of Patent: Jan. 27, 2026

(54) DEVICE, METHOD AND COMPUTER PROGRAM PRODUCT FOR GENERATING LIGHT EFFECT

(71) Applicant: ASUSTEK COMPUTER INC., Taipei (TW)

(72) Inventors: Yun-Cheng Kuei, Taipei (TW);
Kuo-Chung Kao, Taipei (TW);
Chien-Hua Ting, Taipei (TW);
Cheng-Hsien Yang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 51 days.

(21) Appl. No.: 18/745,263

(22) Filed: Jun. 17, 2024

(65) Prior Publication Data

US 2025/0301553 A1    Sep. 25, 2025

(30) Foreign Application Priority Data

Mar. 19, 2024    (TW) .................................. 113110165

(51) Int. Cl.
| | |
|---|---|
| *H05B 47/165* | (2020.01) |
| *G10L 15/26* | (2006.01) |
| *H05B 47/175* | (2020.01) |

(52) U.S. Cl.
CPC ............ *H05B 47/165* (2020.01); *G10L 15/26* (2013.01); *H05B 47/197* (2024.01); *H05B 47/1985* (2024.01)

(58) Field of Classification Search
CPC ................. H05B 47/165; H05B 47/197; H05B 47/1985; G10L 15/26
See application file for complete search history.

(56) References Cited

U.S. PATENT DOCUMENTS

| | | | | |
|---|---|---|---|---|
| 2011/0046953 | A1* | 2/2011 | Arun ...................... | G10L 15/187 704/240 |
| 2025/0157473 | A1* | 5/2025 | Pathak .................... | G10L 15/26 |

FOREIGN PATENT DOCUMENTS

| | | | | |
|---|---|---|---|---|
| CN | 106471570 A | * | 3/2017 | .......... H04M 3/4936 |
| CN | 112566336 A | | 3/2021 | |
| CN | 117202446 A | | 12/2023 | |
| CN | 120148514 A | * | 6/2025 | ............. G10L 15/06 |
| CN | 120186847 A | * | 6/2025 | ........... H05B 47/165 |

(Continued)

*Primary Examiner* — Adam D Houston
(74) *Attorney, Agent, or Firm* — Muncy, Geissler, Olds & Lowe, P.C.

(57) ABSTRACT

A device for generating a light effect is provided. The device includes an input module configured to receive an input text, a processor, and a light-emitting module. The processor is configured to generate, with a language model, an abstract text corresponding to the input text, generate a scenario description text corresponding to the abstract text, generate at least one keyword corresponding to the scenario description text, and generate color data corresponding to the at least one keyword. The processor further generates, with the scenario description text and a preset symbol string as an input for the language model, a scenario symbol string corresponding to the scenario description text, and generates, with a preset algorithm, a number set corresponding to the scenario symbol string. The color data and the number set are combined to generate light effect data to control the light-emitting module to generate a light effect.

20 Claims, 5 Drawing Sheets

(56) References Cited

FOREIGN PATENT DOCUMENTS

| EP | 4571531 A1 | * | 6/2025 | ............ G06F 40/284 |
| KR | 20220112563 A | * | 8/2022 | ............. G06F 40/30 |
| WO | WO-2016209489 A1 | * | 12/2016 | ............. G10L 15/22 |
| WO | WO-2025149444 A1 | * | 7/2025 | ............ H05B 47/197 |

* cited by examiner

FIG. 3 base1 = (120, 30, 255, 0, 200)

base2 = (45, 190, 125, 150, 450)

base3 = (255, 165, 0, 0, 300)

base4 = (0, 0, 255, 200, 500)

base5 = (200, 75, 135, 400, 250)

base6 = (160, 50, 190, 400, 350)

base7 = (30, 200, 180, 0, 400)

base8 = (180, 50, 30, 300, 300)

base9 = (0, 150, 255, 450, 350)

DEVICE, METHOD AND COMPUTER PROGRAM PRODUCT FOR GENERATING LIGHT EFFECT

CROSS-REFERENCE TO RELATED APPLICATION

This application claims the priority benefit of Taiwan application serial No. 113110165, filed on Mar. 19, 2024. The entirety of the above-mentioned patent application is hereby incorporated by reference herein and made a part of the specification.

BACKGROUND OF THE INVENTION

Field of the Invention

The disclosure relates to a light effect technology for an electronic device, and particularly relates to a device, a method, and a computer program product for generating a light effect.

Description of the Related Art

Traditionally, an electronic device (such as a notebook computer) mainly generates a light effect in a preset mode. A user is unlikely to change a light effect setting. In addition, even if some electronic devices provide the user a function of independently setting the light effect, this function is complex in operation and not conducive to operations of the user.

BRIEF SUMMARY OF THE INVENTION

The disclosure provides a device for generating a light effect, configured to operate with a language model. The device includes an input module, a processor, and a light-emitting module. The input module is configured to receive an input text. The processor is electrically coupled to the input module, and is configured to: generate, with the input text as an input for the language model, an abstract text corresponding to the input text; generate, with the abstract text as an input for the language model, a scenario description text corresponding to the abstract text; generate, with the scenario description text as an input for the language model, at least one keyword corresponding to the scenario description text; generate, with the at least one keyword as an input for the language model, color data corresponding to the at least one keyword; generate, with the scenario description text and a preset symbol string as an input for the language model, a scenario symbol string corresponding to the scenario description text based on a format of the preset symbol string; generate, with the scenario symbol string as an input for a preset algorithm, a number set corresponding to the scenario symbol string, where the number set includes at least one number, and the number represents light effect duration; and combine the color data and the number set to generate light effect data. The light-emitting module is electrically coupled to the processor, and is configured to generate the light effect based on the light effect data.

The disclosure further provides a method for generating a light effect, used to generate light effect data with a language model. The light effect data is used to control a light-emitting module to generate the light effect. The method includes: receiving an input text; generating, with the input text as an input for the language model, an abstract text corresponding to the input text; generating, with the abstract text as an input for the language model, a scenario description text corresponding to the abstract text; generating, with the scenario description text as an input for the language model, at least one keyword corresponding to the scenario description text; generating, with the at least one keyword as an input for the language model, color data corresponding to the at least one keyword; generating, with the scenario description text and a preset symbol string as an input for the language model, a scenario symbol string corresponding to the scenario description text based on a format of the preset symbol string; generating, with the scenario symbol string as an input for a preset algorithm, a number set corresponding to the scenario symbol string, where the number set includes at least one number, and the number represents light effect duration; combining the color data and the number set to generate the light effect data; and controlling the light-emitting module by using the light effect data to generate the light effect.

The disclosure further provides a computer program product for generating a light effect, used to generate light effect data with a language model. The light effect data is used to control a light-emitting module to generate the light effect. After the computer program product is loaded to a computer, the computer executes the steps of: receiving an input text; generating, with the input text as an input for the language model, an abstract text corresponding to the input text; generating, with the abstract text as an input for the language model, a scenario description text corresponding to the abstract text; generating, with the scenario description text as an input for the language model, at least one keyword corresponding to the scenario description text; generating, with the at least one keyword as an input for the language model, color data corresponding to the at least one keyword; generating, with the scenario description text and a preset symbol string as an input for the language model, a scenario symbol string corresponding to the scenario description text based on a format of the preset symbol string; generating, with the scenario symbol string as an input for a preset algorithm, a number set corresponding to the scenario symbol string, where the number set includes at least one number, and the number represents light effect duration; combining the color data and the number set to generate the light effect data; and controlling the light-emitting module by using the light effect data to generate the light effect.

According to the device, the method, and the computer program product for generating a light effect in the disclosure, a user only needs to provide the input text, and the light effect data including a color and a rhythm is automatically generated to control the light-emitting module to generate the light effect. This can effectively reduce difficulty in operations of the user and help improve diversity and degree of freedom of light effect designs.

DETAILED DESCRIPTION OF THE EMBODIMENTS

The following describes in more detail specific embodiments of the disclosure with reference to the schematic diagrams. Based on the following description and the patent scope of the disclosure, the advantages and features of the disclosure will be clearer. It is to be noted that all the drawings use a very simplified form and non-precise scales, merely for conveniently and clearly assisting in illustrating the purpose of the embodiments of the disclosure.

Figure 1:
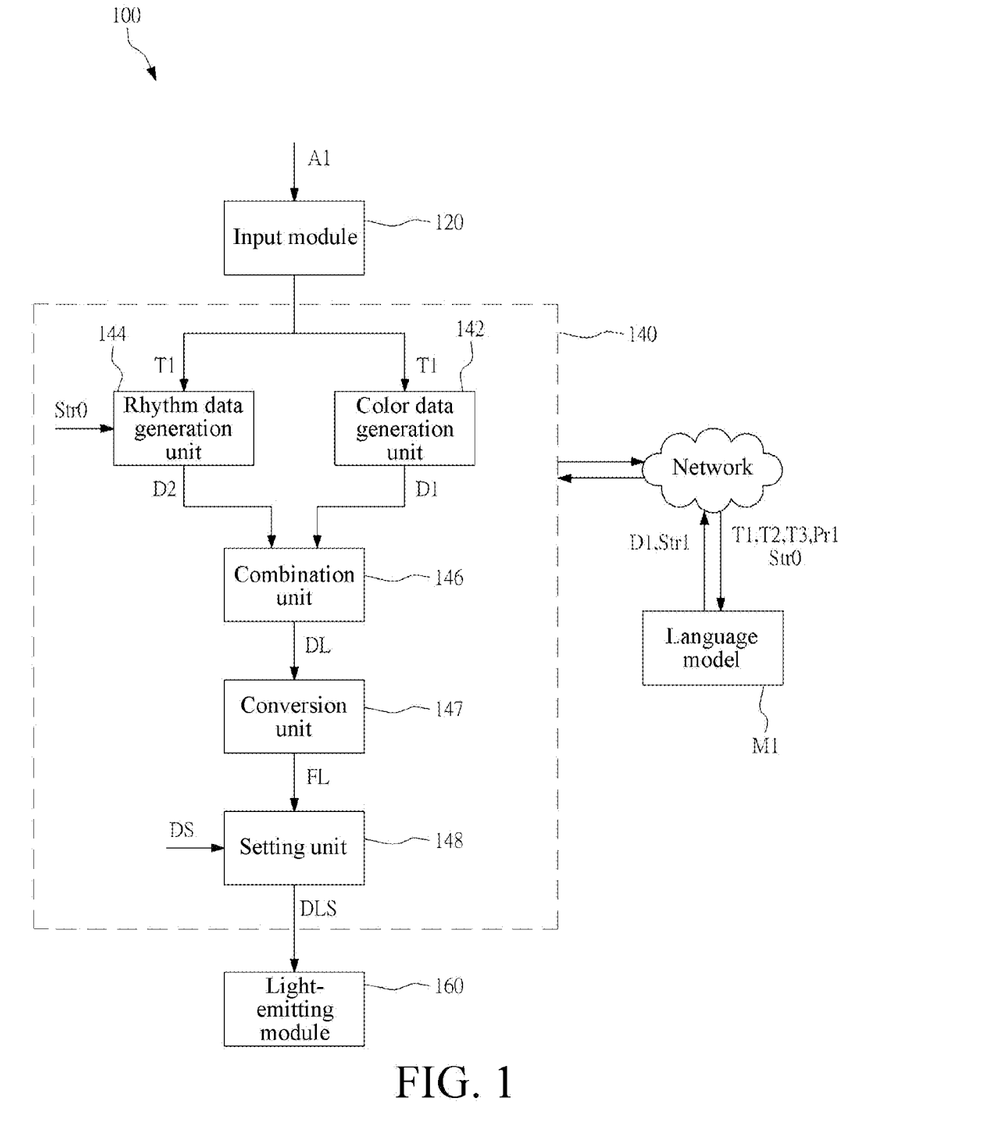
FIG. 1 is a schematic block diagram of a device for generating a light effect according to an embodiment of the disclosure.

FIG. 1 is a schematic block diagram of a device 100 for generating a light effect according to an embodiment of the disclosure.

The device 100 for generating a light effect provided in the disclosure is configured to operate with a language model M1. In an embodiment, the language model M1 is a large language model (LLM), a generative pre-trained transformer (GPT), or a simplified large language model obtained through fine adjustment for a specific purpose. The device 100 communicates, through a network, with the language model M1 provided in a cloud or remote server.

As shown in this figure, the device 100 includes an input module 120, a processor 140, and a light-emitting module 160.

The input module 120 is configured to receive an input text T1. In an embodiment, the input module 120 is a voice input module. The voice input module is configured to receive voice data A1 and convert the voice data A1 into the input text T1.

The processor 140 is electrically coupled to the input module 120, and is configured to generate, with the input text T1 as an input for the language model M1, light effect data DL corresponding to the input text T1. The processor 140 includes a color data generation unit 142, a rhythm data generation unit 144, and a combination unit 146. The color data generation unit 142 is configured to generate color data D1 in the light effect data DL. The rhythm data generation unit 144 is configured to generate rhythm data D2 in the light effect data DL. The combination unit 146 is configured to integrate the color data D1 and the rhythm data D2 to generate the light effect data DL corresponding to the input text T1.

In an embodiment, the color data D1 includes basic color data. The basic color data includes three values corresponding to three primary colors, which are integral values, that is, color code data of red, green, and blue. In an embodiment, basic color data (255, 255, 255) indicates white, and basic color data (255, 0, 0) indicates red. In an embodiment, the rhythm data D2 is a number set, the number set includes a plurality of numbers that represent duration of corresponding light-emitting colors.

A specific processing procedure and a calculation manner in which the processor 140 generates the light effect data DL with the input text T1 as the input for the language model M1 are described in detail later paragraphs.

The light-emitting module 160 is electrically coupled to the processor 140, and is configured to generate the light effect based on the light effect data DL. The light-emitting module 160 includes a plurality of light-emitting elements. The light-emitting elements are monochromatic light-emitting elements or colored light-emitting elements. In an embodiment, the light-emitting elements are arranged on a light-emitting surface in an array, and a distribution range of the light-emitting elements presents a light-emitting contour. Based on an actual design requirement, the light-emitting contour formed by arranging the light-emitting elements is a geometric shape such as a square, a rectangle, or a triangle, or a special pattern such as a trademark.

In an embodiment, the processor 140 further includes a conversion unit 147 and a setting unit 148. After the light effect data DL is generated, the conversion unit 147 is configured to convert the light effect data DL into a light effect file FL for later use. The light effect file FL is an xml file or a Json file. The setting unit 148 generates light effect contour data DLS based on the light effect file FL and light-emitting effect contour data DS (such as dimensional data of the light-emitting contour such as a length and a width or a resolution of the light-emitting element arranged on the light-emitting surface) of the light-emitting module 160, and then sets a light-emitting mode of the light-emitting module 160 by using the light effect contour data DLS. In this way, the light-emitting module 160 is controlled to generate the light effect based on the light effect data DL.

Figure 2:
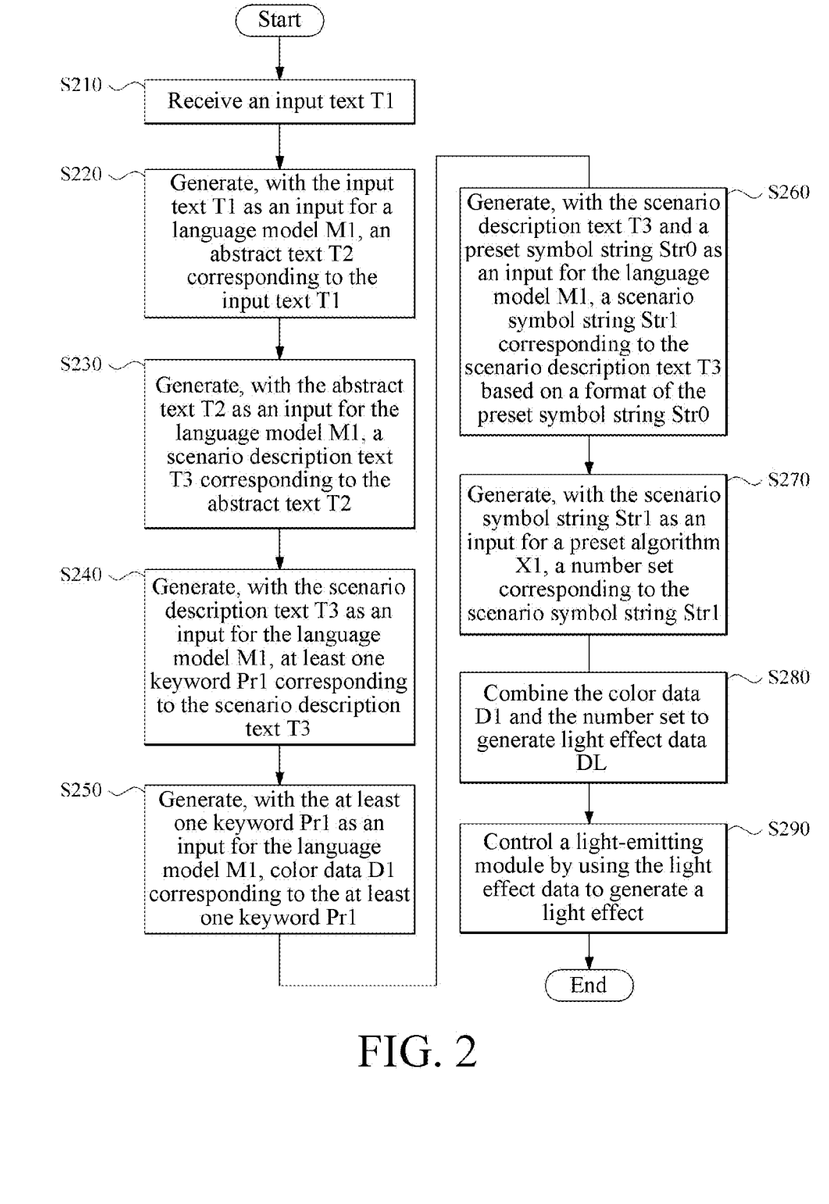
FIG. 2 is a flowchart of a method for generating a light effect according to an embodiment of the disclosure.

FIG. 2 is a flowchart of a method for generating a light effect according to an embodiment of the disclosure.

The method is applied to the device 100 shown in FIG. 1, and is used to generate the light effect data DL with the language model M1, to further control the light-emitting module 160 to generate the light effect. The method includes the following steps.

First, as shown in step S210, the input text T1 is received. Refer to FIG. 1 together. This step is performed by the input module 120 in FIG. 1.

Then, as shown in step S220, an abstract text T2 corresponding to the input text T1 is generated with the input text T1 as an input for the language model M1.

Next, as shown in step S230, a scenario description text T3 corresponding to the abstract text T2 is generated with the abstract text T2 as an input for the language model M1.

Then, as shown in step S240, at least one keyword Pr1 corresponding to the scenario description text T3 is generated with the scenario description text T3 as an input for the language model M1.

Then, as shown in step S250, the color data D1 corresponding to the at least one keyword Pr1 is generated with the at least one keyword Pr1 as an input for the language model M1. Refer to FIG. 1 together. Steps S220 to S250 are performed by the color data generation unit 142 in FIG. 1.

In an embodiment, it is assumed that the input text T1 is a description article about an autumn mountain forest. In this case, the abstract text T2 generated in step S220 is "autumn maple leaves". The scenario description text T3 on a subject of "autumn maple leaves" is generated in step S230. Keywords Pr1 such as "maple red" and "fallen leaves" are generated based on the scenario description text T3 in step S240. The color data D1 such as red and yellow is generated based on the keywords Pr1 such as "red maple" and "fallen leaves" in step S250.

In the disclosure, the abstract text T2 is generated with the language model M1 based on the input text T1, so that a problem that excessively complex input text T1 is not conducive to accurate keyword extraction is effectively avoided. In addition, the scenario description text T3 is generated with the language model M1 based on the abstract text T2, and then the keyword Pr1 is extracted based on the scenario description text T3, so that a problem that an ideal keyword Pr1 cannot be effectively generated based on excessively brief abstract text T2 is avoided.

Then, as shown in step S260, a scenario symbol string Str1 corresponding to the scenario description text T3 is generated with the scenario description text T3 and a preset symbol string Str0 as an input for the language model M1 based on a format of the preset symbol string Str0.

In an embodiment, the preset symbol string Str0 includes a plurality of sectional symbols, at least one non-blank symbol, and at least one blank symbol. In an embodiment, when the sectional symbol is "|", the non-blank symbol is "x", and the blank symbol is "-", the preset symbol string Str0 is, for example: x---|x-x-|-x-x|. The sectional symbols repeatedly appear in the preset symbol string Str0 at a preset interval, to represent that there is a section between adjacent sectional symbols.

In step S260, the language model M1 is required to generate the scenario symbol string Str1 in a format similar to that of the preset symbol string Str0 with the format of the preset symbol string Str0 as a model (for example, a position of the sectional symbol is fixed, and a symbol type is limited to the symbols appearing in the preset symbol string Str0) and with the scenario description text T3 as the input.

Figure 3:
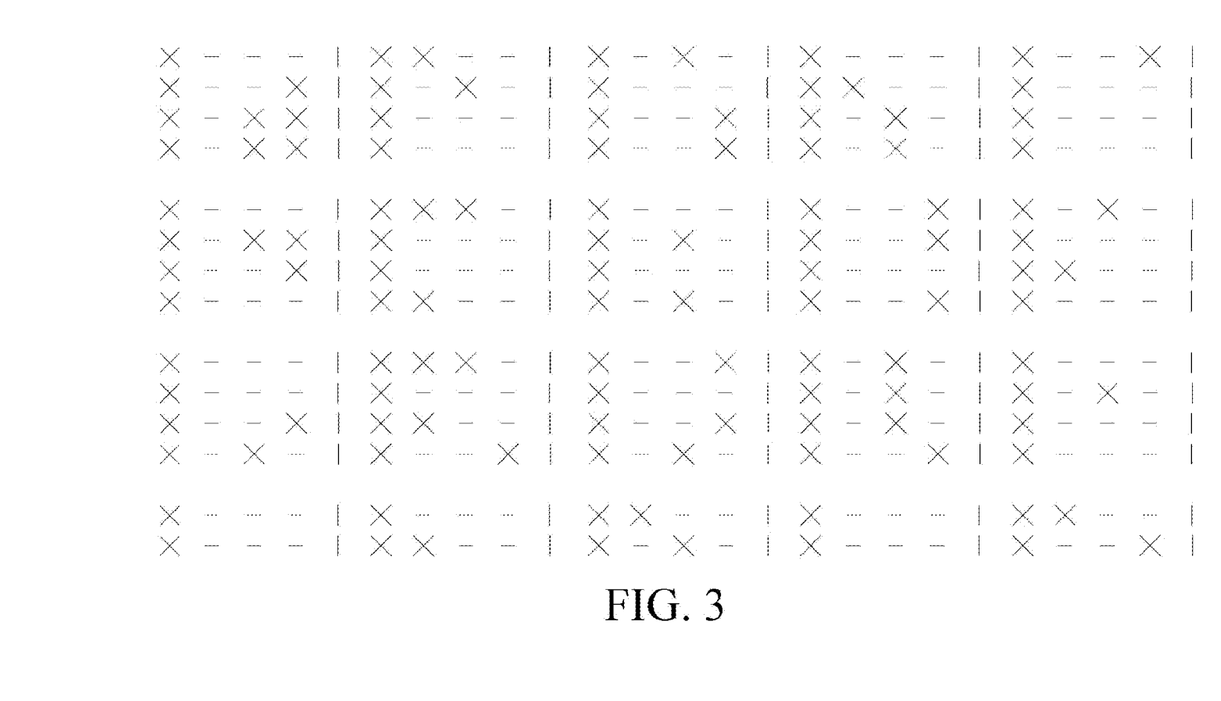
FIG. 3 shows a scenario symbol string generated according to an embodiment of the disclosure.

Refer to FIG. 3 together. FIG. 3 shows the scenario symbol string Str1 generated according to an embodiment of the disclosure. As shown in this figure, the format of the scenario symbol string Str1 is similar to that of the preset symbol string Str0: a number of symbols between sectional symbols in the scenario symbol string Str1 is the same as a number of symbols between the sectional symbols in the preset symbol string Str0, and the scenario symbol string Str1 and the preset symbol string Str0 each include the sectional symbol "|", the non-blank symbol "x", and the blank symbol "-".

Then, as shown in step S270, the number set corresponding to the scenario symbol string Str1 is generated with the scenario symbol string Str1 as an input for a preset algorithm X1. The number set is the rhythm data D2. The number set includes at least one number. The number represents light effect duration. Refer to FIG. 1 together. Steps S260 and S270 are performed by the rhythm data generation unit 144 in FIG. 1.

In an embodiment, the preset algorithm X1 used in step S270 generates the number set (that is, the rhythm data D2) corresponding to the scenario symbol string Str1 based on the number of symbols between two adjacent non-blank symbols in the scenario symbol string Str1. In an embodiment, a conversion principle of the preset algorithm X1 is that when a number of blank symbols ("-") between two non-blank symbols ("x") in the scenario symbol string Str1 is larger, a corresponding number is larger, and the number of blank symbols ("-") between the two non-blank symbols ("x") is substantially in direct proportion to the corresponding number. These numbers are used to represent different rhythms.

In this embodiment, the preset symbol string Str0 includes three symbols: the sectional symbol "|", the non-blank symbol "x", and the blank symbol "-". However, the disclosure is not limited thereto. In another embodiment, more types of symbols are set, or different symbols are used to represent the sectional symbol, the non-blank symbol, and the blank symbol. In an embodiment, in addition to the sectional symbol, the non-blank symbol, and the blank symbol, a pause symbol is set to represent duration of a light effect pause.

Then, as shown in step S280, the color data D1 and the number set (that is, the rhythm data D2) are combined to generate the light effect data DL. In an embodiment, this step is performed by the combination unit 146 in FIG. 1.

Figure 4:
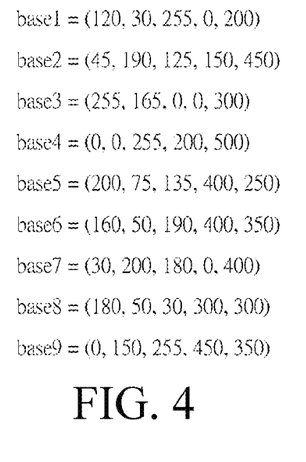
FIG. 4 shows light effect data generated according to an embodiment of the disclosure.

Refer to FIG. 4 together. FIG. 4 shows the light effect data DL generated according to an embodiment of the disclosure. The light effect data DL presents nine sets of light effect changes. Each set of light effect change is represented by five numbers, where the first three numbers represent the color data D1, that is, color codes of red, green, and blue, and the last two numbers represent the rhythm data D2 corresponding to a light effect change detail such as the duration and a light effect change rate. In this embodiment, the two numbers represent starting time and the light effect duration respectively.

Then, as shown in step S290, the light-emitting module 160 is controlled by using the light effect data DL to generate the light effect. Refer to FIG. 1 together. In an embodiment, this step is performed by the conversion unit 147 and the setting unit 148 in FIG. 1.

Figure 5:
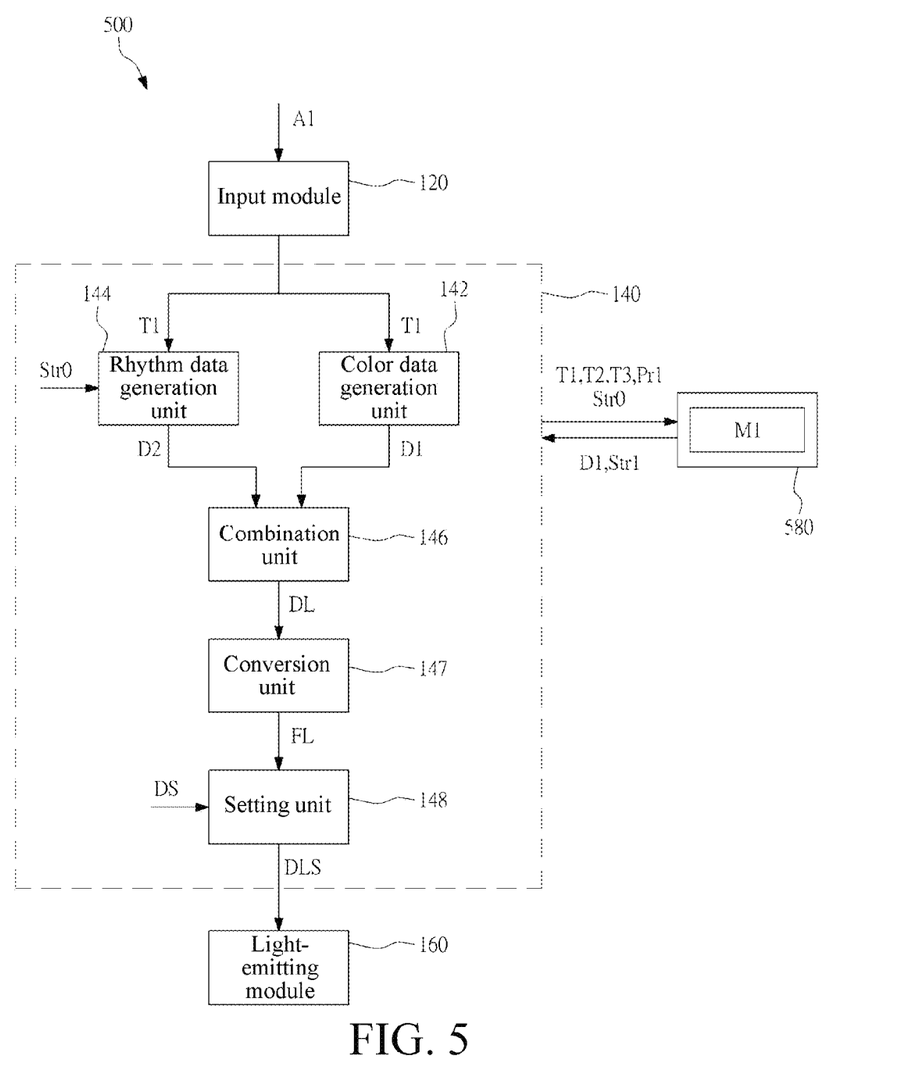
FIG. 5 is a schematic block diagram of a device for generating a light effect according to another embodiment of the disclosure.

FIG. 5 is a schematic block diagram of a device 500 for generating a light effect according to another embodiment of the disclosure.

Compared with the embodiment shown in FIG. 1, the device 500 in this embodiment further includes a storage unit 580 configured to store the language model M1. The storage unit 580 is a storage medium such as a memory, a hard disk, or a solid state disk. In an embodiment, the language model M1 is a large language model, a generative pre-trained transformer, or a simplified large language model obtained through fine adjustment for a specific purpose.

The device 100 in the embodiment shown in FIG. 1 needs to be connected, through an Internet, to the language model M1 in the cloud or remote server for operation. In this embodiment, the language model M1 is provided at a user side, helping reduce traffic on a network and increase an overall operation speed.

In addition to the devices 100 and 500 and the method, the disclosure further provides a computer program product for generating a light effect, used to generate the light effect data DL with the language model M1. The light effect data is used to control the light-emitting module 160 to generate the light effect. After the computer program product is loaded to a computer, the computer executes the steps of: receiving the input text T1; generating, with the input text T1 as an input for the language model M1, the abstract text T2 corresponding to the input text T1; generating, with the abstract text T2 as an input for the language model M1, the scenario description text T3 corresponding to the abstract text T2; generating, with the scenario description text T3 as an input for the language model M1, the at least one keyword Pr1 corresponding to the scenario description text T3; generating, with the at least one keyword Pr1 as an input for the language model M1, the color data D1 corresponding to the at least one keyword Pr1; generating, with the scenario description text T3 and the preset symbol string Str0 as an input for the language model M1, the scenario symbol string Str1 corresponding to the scenario description text T3 based on a format of the preset symbol string Str0; generating, with the scenario symbol string Str1 as an input for the preset algorithm X1, a number set corresponding to the scenario symbol string Str1, where the number set includes at least one number, and the number represents light effect duration; combining the color data D1 and the number set to generate the light effect data DL; and controlling the light-emitting module 160 by using the light effect data DL to generate the light effect.

In summary, according to the devices 100 and 500, the method, and the computer program product for generating a light effect in the disclosure, a user only needs to provide the input text T1, and the light effect data DL including a color and a rhythm is automatically generated to control the light-emitting module 160 to generate the light effect. This can effectively reduce difficulty in operations of the user and help improve diversity and degree of freedom of light effect designs.

The above is merely a preferred embodiment of the disclosure and not intended to limit the disclosure. Any form of variations such as equivalent replacements or modifications made by any one of skilled in the art to the technical means and technical content disclosed in the disclosure without departing from the scope of the technical means of the disclosure belong to content not departing from the technical means of the disclosure, and fall within the scope of protection of the disclosure.

What is claimed is:

1. A device for generating a light effect, configured to operate with a language model, wherein the device comprises:
    an input module, configured to receive an input text;
    a processor, electrically coupled to the input module and configured to:
    generate, with the input text as an input for the language model, an abstract text corresponding to the input text;
    generate, with the abstract text as an input for the language model, a scenario description text corresponding to the abstract text;
    generate, with the scenario description text as an input for the language model, at least one keyword corresponding to the scenario description text;
    generate, with the at least one keyword as an input for the language model, color data corresponding to the at least one keyword;
    generate, with the scenario description text and a preset symbol string as an input for the language model, a scenario symbol string corresponding to the scenario description text based on a format of the preset symbol string;
    generate, with the scenario symbol string as an input for a preset algorithm, a number set corresponding to the scenario symbol string, wherein the number set comprises at least one number, and the number represents light effect duration; and
    combine the color data and the number set to generate light effect data; and
    a light-emitting module, electrically coupled to the processor and configured to generate the light effect based on the light effect data.

2. The device according to claim 1, wherein the processor is further configured to convert the light effect data into a light effect file, and set the light-emitting module by using the light effect file.

3. The device according to claim 2, wherein the light effect file is an xml file or a Json file.

4. The device according to claim 2, wherein the processor generates light effect contour data based on the light effect file and light-emitting contour data of the light-emitting module, and sets the light-emitting module by using the light effect contour data.

5. The device according to claim 1, wherein the preset symbol string comprises a plurality of sectional symbols, at least one non-blank symbol, and at least one blank symbol, and the sectional symbols repeatedly appear in the preset symbol string at a preset interval.

6. The device according to claim 5, wherein the preset algorithm generates the number set corresponding to the scenario symbol string based on a number of symbols between two adjacent non-blank symbols in the scenario symbol string.

7. The device according to claim 1, wherein the language model is a large language model (LLM).

8. The device according to claim 1, wherein the input module is a voice input module, and is configured to receive voice data and convert the voice data into the input text.

9. The device according to claim 1, wherein the color data comprises basic color data, and the basic color data comprises three values corresponding to three primary colors.

10. The device according to claim 1, wherein the device comprises a storage unit configured to store the language model.

11. A method for generating a light effect, used to generate light effect data with a language model, wherein the light effect data is used to control a light-emitting module to generate the light effect, and the method comprises:
    receiving an input text;
    generating, with the input text as an input for the language model, an abstract text corresponding to the input text;
    generating, with the abstract text as an input for the language model, a scenario description text corresponding to the abstract text;
    generating, with the scenario description text as an input for the language model, at least one keyword corresponding to the scenario description text;
    generating, with the at least one keyword as an input for the language model, color data corresponding to the at least one keyword;
    generating, with the scenario description text and a preset symbol string as an input for the language model, a scenario symbol string corresponding to the scenario description text based on a format of the preset symbol string;
    generating, with the scenario symbol string as an input for a preset algorithm, a number set corresponding to the scenario symbol string, wherein the number set comprises at least one number, and the number represents light effect duration;
    combining the color data and the number set to generate the light effect data; and
    controlling the light-emitting module by using the light effect data to generate the light effect.

12. The method according to claim 11, wherein the step of controlling the light-emitting module by using the light effect data to generate the light effect comprises:
    converting the light effect data into a light effect file; and
    setting the light-emitting module by using the light effect file.

13. The method according to claim 12, wherein the light effect file is an xml file or a Json file.

14. The method according to claim 12, wherein the step of setting the light-emitting module by using the light effect file comprises:
    generating light effect contour data based on the light effect file and light-emitting contour data of the light-emitting module; and
    setting the light-emitting module by using the light effect contour data.

15. The method according to claim 11, wherein the preset symbol string comprises a plurality of sectional symbols, at least one non-blank symbol, and at least one blank symbol, and the sectional symbols repeatedly appear in the preset symbol string at a preset interval.

16. The method according to claim 15, wherein the preset algorithm generates the number set corresponding to the scenario symbol string based on a number of symbols between two adjacent non-blank symbols in the scenario symbol string.

17. The method according to claim 11, wherein the language model is a large language model (LLM).

18. The method according to claim 11, wherein the step of receiving an input text comprises:
   receiving voice data; and
   converting the voice data into the input text.

19. The method according to claim 11, wherein the color data comprises basic color data, and the basic color data comprises three values corresponding to three primary colors.

20. A computer program product for generating a light effect, used to generate light effect data with a language model, wherein the light effect data is used to control a light-emitting module to generate the light effect, and after the computer program product is loaded to a computer, the computer executes the steps of:
   receiving an input text;
   generating, with the input text as an input for the language model, an abstract text corresponding to the input text;
   generating, with the abstract text as an input for the language model, a scenario description text corresponding to the abstract text;
   generating, with the scenario description text as an input for the language model, at least one keyword corresponding to the scenario description text;
   generating, with the at least one keyword as an input for the language model, color data corresponding to the at least one keyword;
   generating, with the scenario description text and a preset symbol string as an input for the language model, a scenario symbol string corresponding to the scenario description text based on a format of the preset symbol string;
   generating, with the scenario symbol string as an input for a preset algorithm, a number set corresponding to the scenario symbol string, wherein the number set comprises at least one number, and the number represents light effect duration;
   combining the color data and the number set to generate the light effect data; and
   controlling the light-emitting module by using the light effect data to generate the light effect.

* * * * *